US008755398B2

(12) United States Patent
Bauder et al.

(10) Patent No.: US 8,755,398 B2

(45) Date of Patent: Jun. 17, 2014

(54) MULTIPLEXED SERIAL CONTROL BUS

(75) Inventors: Ruediger Bauder, Feldkirchen-Westerham (DE); Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 674 days.

(21) Appl. No.: 12/962,941

(22) Filed: Dec. 8, 2010

(65) Prior Publication Data

US 2011/0133852 A1 Jun. 9, 2011

Related U.S. Application Data

(60) Provisional application No. 61/285,080, filed on Dec. 9, 2009, provisional application No. 61/348,835, filed on May 27, 2010.

(51) Int. Cl.
*H04L 12/28* (2006.01)
*H04B 3/00* (2006.01)

(52) U.S. Cl.
USPC ............................ 370/419; 370/339; 375/257

(58) Field of Classification Search
USPC .......... 370/339, 389, 419, 533; 375/257, 316, 375/353
See application file for complete search history.

(56) References Cited

U.S. PATENT DOCUMENTS

| | | | | |
|---|---|---|---|---|
| 4,881,081 | A * | 11/1989 | Yoshihara | 342/359 |
| 5,305,373 | A * | 4/1994 | Mizumoto | 455/463 |
| 6,557,062 | B1 * | 4/2003 | Shaler et al. | 710/110 |
| 8,411,763 | B2 * | 4/2013 | Sychaleun et al. | 375/257 |
| 2002/0039885 | A1 * | 4/2002 | Weissman et al. | 455/20 |
| 2005/0085208 | A1 * | 4/2005 | Sorrells et al. | 455/313 |

OTHER PUBLICATIONS

"Bus Functional Specification," DiSEqC™ (Digital Satellite Equipment Control) Specification, Version 4.2, Feb. 25, 1998, pp. 1-24, EUTELSAT (European Telecommunication Satellite Organization).
"Simple 'Toneburst' Detection Circuit," DiSEqC™ (Digital Satellite Equipment Control) Document, Aug. 12, 1996, pp. 1-14, EUTELSAT (European Telecommunication Satellite Organization).
"Update and Recommendations for Implementation," DiSEqC™ (Digital Satellite Equipment Control) Document, Version 2.1, Feb. 25, 1998, pp. 1-40, EUTELSAT (European Telecommunication Satellite Organization).

* cited by examiner

*Primary Examiner* — Hassan Phillips
*Assistant Examiner* — Saba Tsegaye
(74) *Attorney, Agent, or Firm* — Withrow & Terranova, P.L.L.C.

(57) ABSTRACT

A signal line sharing protocol and hardware permit control of a remotely located active device configured to provide different load configurations to an antenna. As an example, the communication system may include a master device. The master device may include a general purpose output and a radio frequency port. The communication system may further include a first duplexer and a second duplexer. The first duplexer may include a first port, a second port, and a third port, where the second port is coupled to the radio frequency port and the third port is coupled to the general purpose output of the master device. The second duplexer may include a first port, a second port, and a third port, where the first port of the second duplexer is in communication with the first port of the first duplexer, wherein the second port is coupled to an antenna, and where the third port is in communication with a slave device. The slave device may be coupled to the antenna. In response to commencement of a command from the master device, the slave device may clamp the antenna to ground.

17 Claims, 4 Drawing Sheets

MULTIPLEXED SERIAL CONTROL BUS

RELATED APPLICATIONS

This application claims the benefit of provisional patent application Nos. 61/285,080, filed Dec. 9, 2009 and 61/348,835, filed May 27, 2010, the disclosures of which are incorporated herein by reference in their entirety.

FIELD OF THE DISCLOSURE

Embodiments described herein relate to communication and control bus interfaces. In addition, embodiments described herein relate further to controlling a slave device without a dedicated control wire.

BACKGROUND

Multiple standards have competing requirements that limit the ability of a user to simultaneously use different standards. As an example, both 802.11b/g/n and Bluetooth standards operate at 2.4 GHz, which can result in interference problems. In some cases, devices physically separate the Wi-Fi and Bluetooth antennas to overcome the potential interference problems. In other cases, the 802.11/b/g/n and the Bluetooth operations are configured to disable one operation before beginning the other operation, which prevents simultaneous operation.

In addition, there may be a desire to provide different antenna matching loads depending upon the operation of the wireless interface. This may require the ability to control the load matching of an antenna remotely, which may include active tuning of an antenna.

To overcome these problems without adding additional wires, there is a need to provide a control means over the existing wiring to permit addition of a controlled device near an antenna. There is also a need for a simple control function to control remote devices that have no dedicated supply, control, or signal lines.

SUMMARY

Example embodiments described in the detailed description provide a signal line sharing protocol, power supply voltage, and hardware to permit a master device to control a remotely located active device configured to provide different load configurations to an antenna. The master device and the remotely located active device are in communication via a coaxial line and two duplexers. The coaxial line signal line serves as a radio frequency signal line to the antenna, a direct current power supply line, and a control signal line. By sharing the coaxial line signal line to carry three separate signals, the master device may interoperate with the remotely located active device, also referred to as a slave device, without the need for additional wires.

As an example embodiment, a communication system may include a master device. The master device may include a general purpose output and a radio frequency port. The communication system may further include a first duplexer and a second duplexer. The first duplexer may include a first port, a second port, and a third port, where the second port is coupled to the radio frequency port and the third port is coupled to the general purpose output of the master device. The second duplexer may include a first port, a second port, and a third port, where the first port of the second duplexer is in communication with the first port of the first duplexer, wherein the second port is coupled to an antenna, and where the third port is in communication with a slave device. The slave device may be coupled to the antenna. In response to commencement of a command from the master device, the slave device may clamp the antenna to ground.

Another exemplary embodiment may include an operation for sending radio frequency data and commands over a coaxial cable. The operation may comprise receiving a supply voltage at a slave device via a coaxial cable. The operation may further include receiving a first preset pulse at the slave device via the coaxial cable. In response to the first preset pulse, the slave device may enter a receive mode and clamp an input of an antenna to ground. The operation may further include receiving an address at the slave device via the coaxial cable. The operation may further include receiving a first validation signal at the slave device via the coaxial cable, and in response to receipt of the first validation signal, the slave device validating the address. The operation may further include receiving a preset signal at the slave device via the coaxial cable. The operation may further include receiving a command at the slave device via the coaxial cable. The operation may further include receiving a second validation signal at the slave device via the coaxial cable, and in response to receipt of the second validation signal, unclamping the input of the antenna with the slave device.

Still another exemplary embodiment of a communication system comprises a first duplexer including a first terminal, a second terminal and a third terminal. The communication system may include a coaxial cable having a first end and a second end. The first end of the coaxial cable may be coupled to the third terminal of the first duplexer. The communication system may further include a second duplexer, where the second duplexer includes a first terminal, a second terminal, and a third terminal, and where the third terminal is coupled to the second end of the coaxial cable. The communication system may also include a master device having a radio frequency port coupled to the first terminal of the first duplexer, and a control terminal coupled to the second terminal of the first duplexer. The communication system may also include a low pass filter having an input and an output. The input of the low pass filter may be coupled to the second terminal of the second duplexer. The communication system may further include an antenna coupled to the first terminal of the second duplexer and a slave device having a power supply input coupled to the output of the low pass filter. The control input terminal of the slave device may be coupled to the second terminal of the second duplexer. The slave device may further include a plurality of switches coupled to the antenna, where at least one of the plurality of switches is coupled to ground.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Example embodiments described in the detailed description provide a signal line sharing protocol, power supply voltage, and hardware to permit a master device to control a remotely located active device configured to provide different load configurations to an antenna. The master device and the remotely located active device are in communication via a coaxial line and two duplexers. The coaxial line signal line serves as a radio frequency signal line to the antenna, a direct current power supply line, and a control signal line. By sharing the coaxial line signal line to carry three separate signals, the master device may interoperate with the remotely located active device, also referred to as a slave device, without the need for additional wires.

As an example embodiment, a communication system may include a master device. The master device may include a general purpose output and a radio frequency port. The communication system may further include a first duplexer and a second duplexer. The first duplexer may include a first port, a second port, and a third port, where the second port is coupled to the radio frequency port and the third port is coupled to the general purpose output of the master device. The second duplexer may include a first port, a second port, and a third port, where the first port of the second duplexer is in communication with the first port of the first duplexer, wherein the second port is coupled to an antenna, and where the third port is in communication with a slave device. The slave device may be coupled to the antenna. In response to commencement of a command from the master device, the slave device may clamp the antenna to ground.

Figure 1:
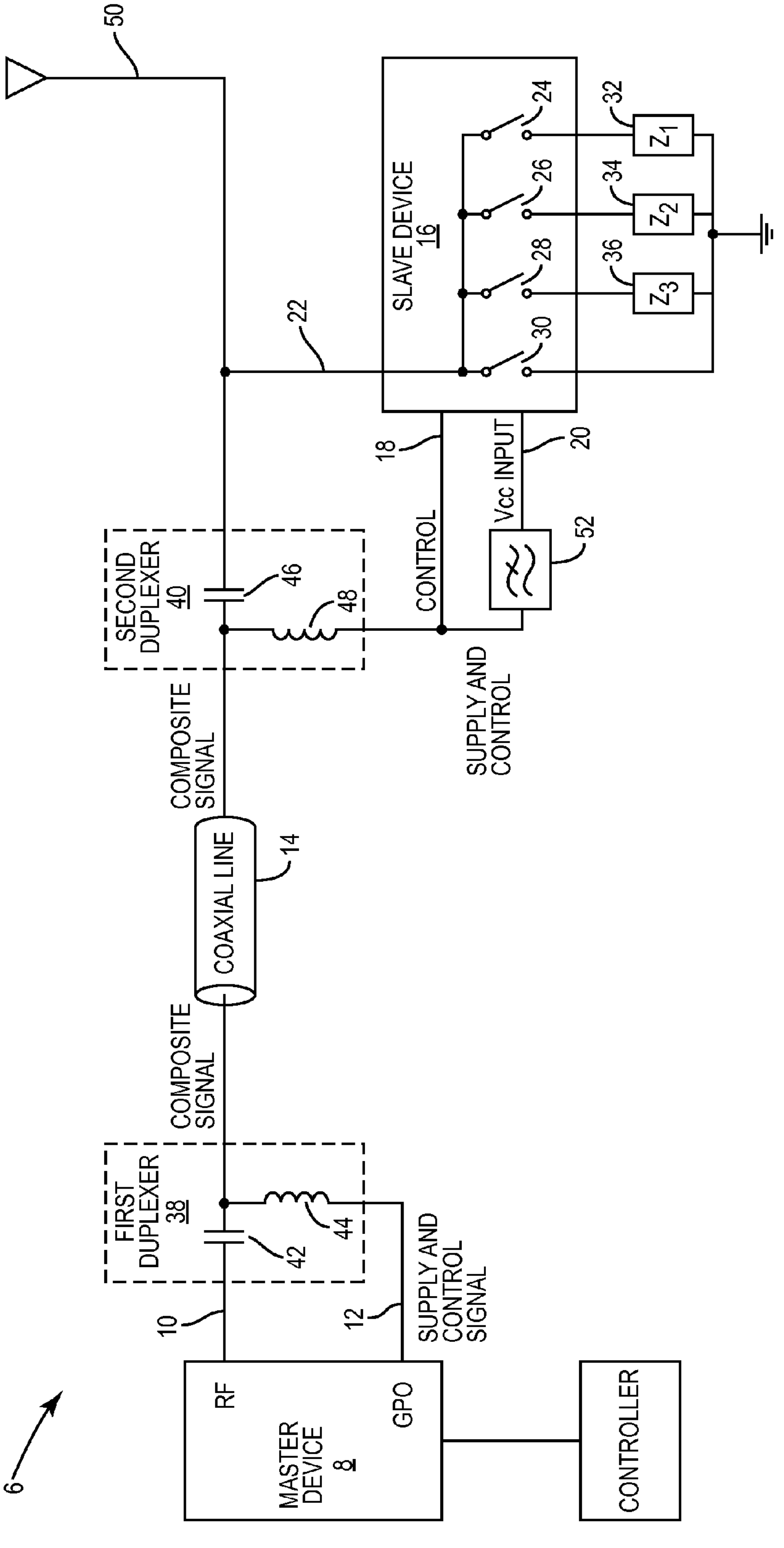
FIG. 1 depicts a simplex based control system.

FIG. 1 depicts a first interface multiplexing circuit 6 including a master device 8 having a radio frequency output signal 10 and a general purpose output signal 12. The master device 8 is in communication, via a coaxial line 14, with a slave device 16. The master device 8 includes a radio frequency (RF) output signal 10 and a general purpose output (GPO) signal 12. The slave device 16 includes a control input 18, a $V_{CC}$ input 20, an antenna connection interface 22, a first switch 24 having a first node and a second node, a second switch 26 having a first node and a second node, a third switch 28 having a first node and a second node, and a fourth switch 30 having a first node and a second node. The first nodes of the first switch 24, the second switch 26, the third switch 28, and the fourth switch 30 are coupled together to form the antenna connection interface 22. The second node of the first switch 24 may be coupled to a first load 32. The second node of the second switch 26 may be coupled to a second load 34. The second node of the third switch 28 may be coupled to a third load 36. The second node of the fourth switch 30 may be coupled to ground. The first load 32, the second load 34, and the third load 36 may be externally coupled to the slave device 16. In other embodiments, the first load 32, the second load 34, and the third load 36 may be internal to the slave device 16 (not shown).

The first interface multiplexing circuit 6 may further include a first duplexer 38 and a second duplexer 40. The first duplexer 38 includes a high band pass filter 42 coupled to the radio frequency output signal 10 and a low band pass filter 44. The high band pass filter 42 may be a capacitor. The high band pass filter 42 may be coupled to the radio frequency output 10.

The high band pass filter 42 and low band pass filter 44 are coupled to form a composite signal to be sent through the coaxial line 14.

The second duplexer 40 includes a high band pass filter 46 and a low band pass filter 48. The high band pass filter 46 and the low band pass filter 48 of the second duplexer 40 are joined together to receive the composite signal sent through the coaxial line 14. The high band pass filter 46 may be a capacitor. The low band pass filter 48 may be an inductor or a choke.

The high band pass filter 46 of the second duplexer 40 may be coupled to the antenna 50 and the antenna connection interface 22 of the slave device 16. The low band pass filter 48 may be coupled to the control input 18 of the slave device 16 and a low pass filter 52. The low pass filter 52 filters the supply and control signal to provide an input to the $V_{CC}$ input of the slave device 16. The low pass filter 52 may further provide an input to a power-on reset input (not shown) of the slave device 16.

Figure 2:
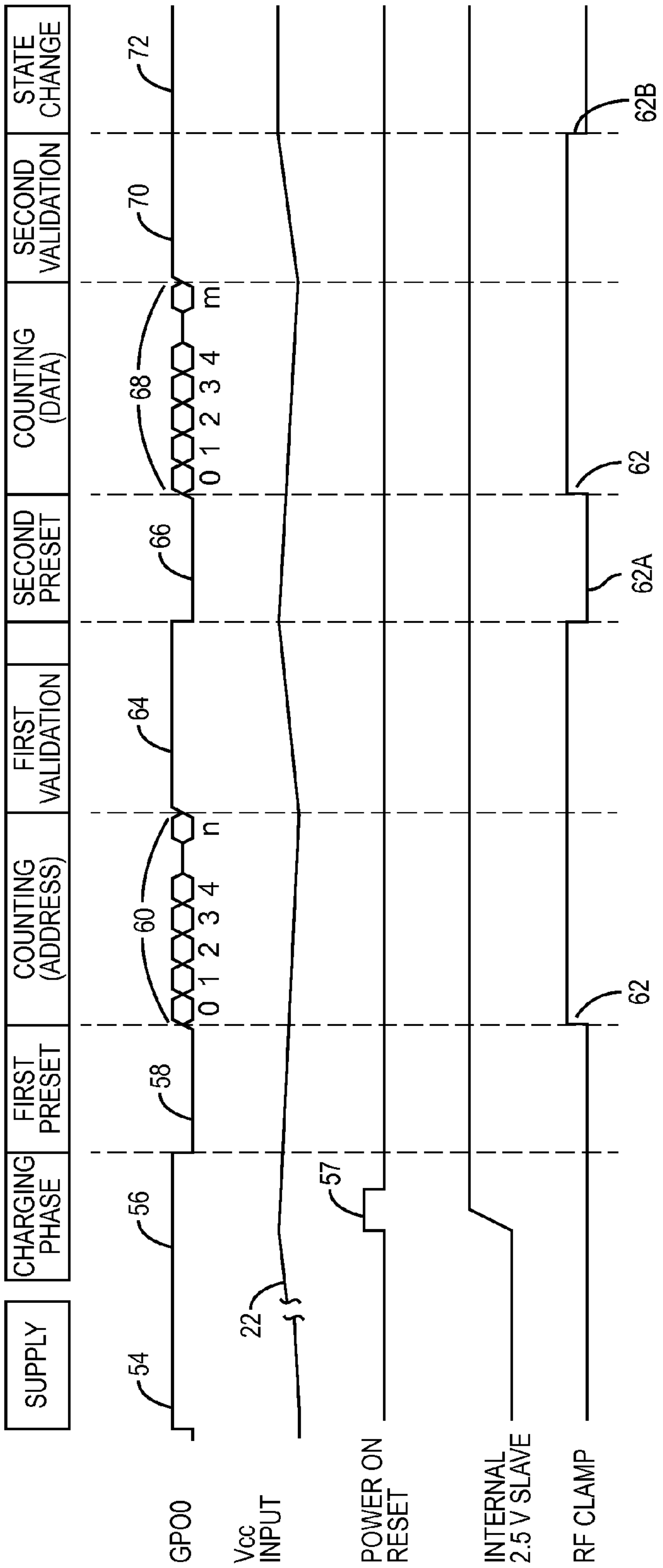
FIG. 2 depicts an operation of the simplex based control system of FIG. 1.
Figure 3A:
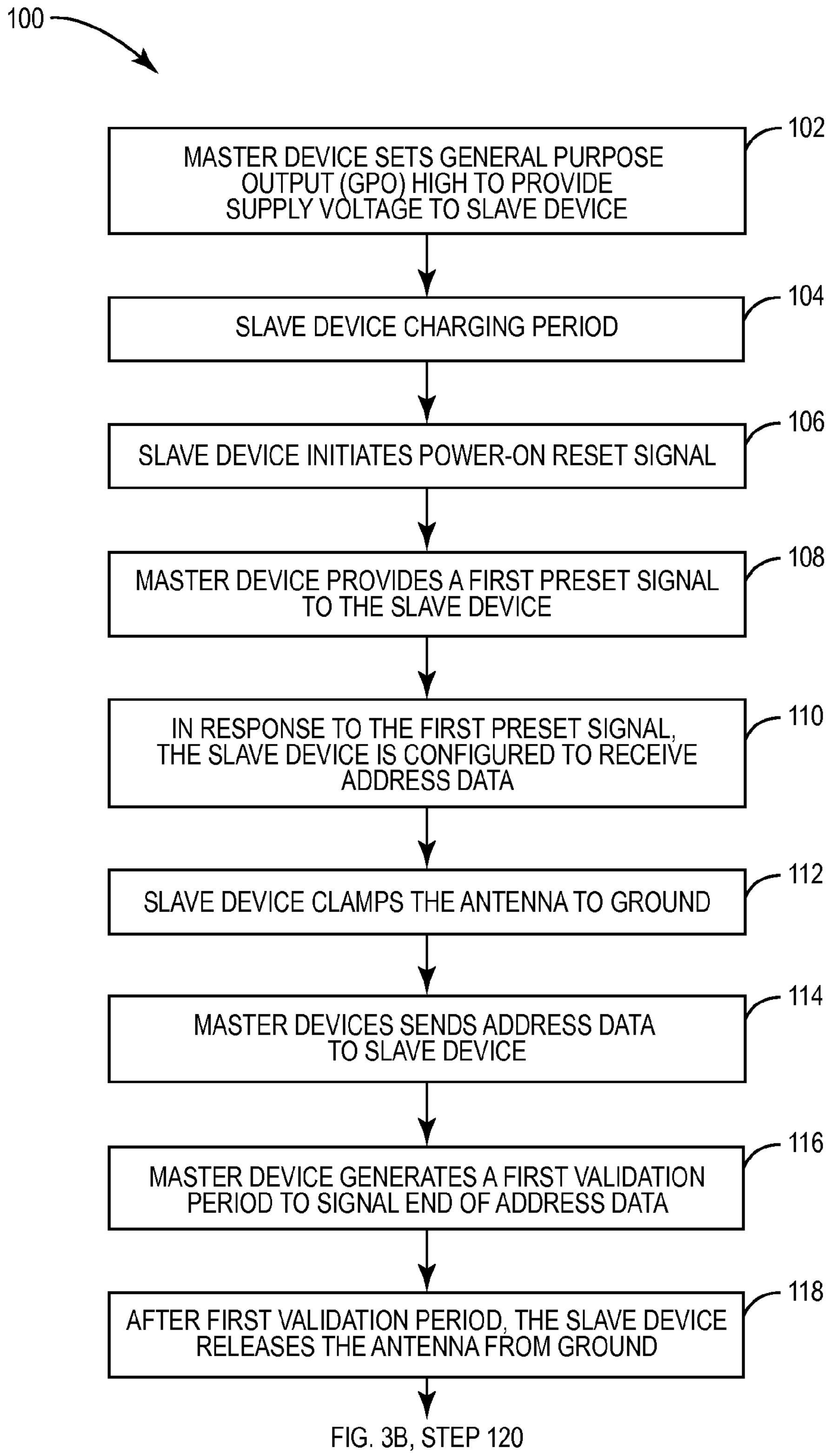
FIG. 3 depicts signals used to perform the operation of the simplex based control system of FIGS. 1 and 2.
Figure 3B:
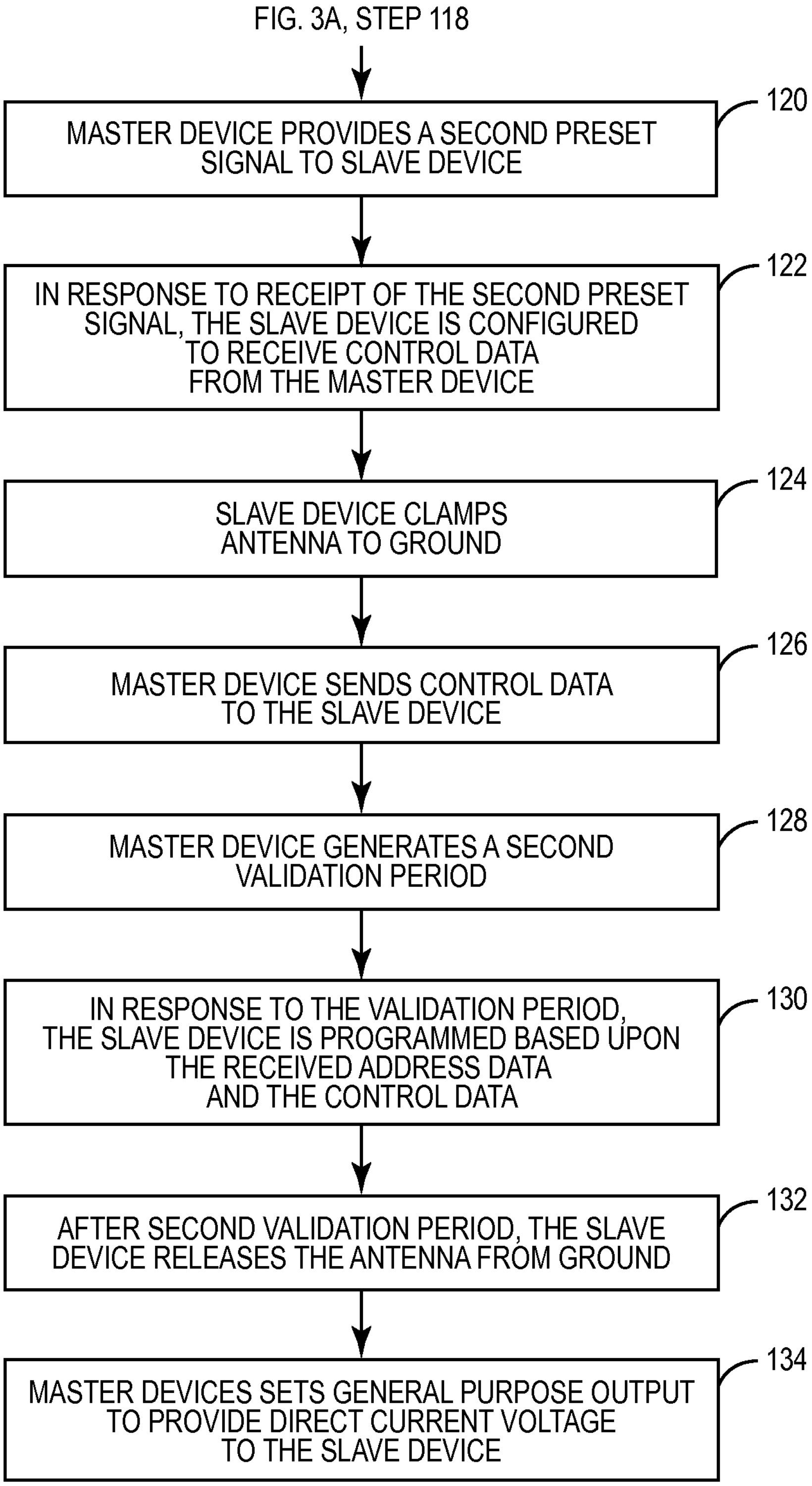

FIG. 2 depicts an operation of the simplex based control system of FIG. 1. As depicted in FIG. 2, with continuing reference to FIG. 1 and reference to FIG. 3, a control signal may be sent from the general purpose output signal 12 of the master device 8 to the slave device 16, (Operation 100). The master device 8 sets the general purpose output signal 12 of the master device 8 high 54 to provide a supply voltage to the slave device 16, (Act 102). The supply voltage to the slave device 16 remains in the high state during a charging period 56. During the charging period 56, the slave device 16 may rectify the received general purpose output signal 12 and charge a storage capacitor (not shown), (Act 104). The slave device 16 may generate a stable direct current (DC) voltage, which isolates the $V_{CC}$ input signal 20 from spurs and noise. In some embodiments, the slave device 16 may include a charge pump (not shown) to produce the stable DC voltage for the operation of the slave device 16.

After the supply voltage of the slave device 16 reaches a threshold level, the slave device 16 may initiate a power-on reset signal (POR) 57 that is internal to the slave device 16, (Act 106). Alternatively, the $V_{CC}$ input signal 20 may be coupled to a power-on reset input (POR), which is not shown in FIG. 1. In some embodiments, the slave device 16 may include an internal voltage doubler (not shown) that commences operation following initialization of the power-on reset signal.

After a charging period 56 and generation of the power-on reset signal 57, the general purpose output signal 12 may generate a first preset signal 58, (Act 108). To generate the first preset signal 58, the general purpose output signal 12 goes low for four clock cycles. The first preset signal 58 provides an indication to the slave device 16 that address data is to be sent by the master device 8. In response to receipt of the first preset signal 58, the slave device is configured to receive address data sent from the master device 8, (Act 110). In addition, the slave device closes the fourth switch 30 of the slave device 16, which activates the RF clamp signal 62, to ground the antenna 50, (Act 112). When the RF clamp signal 62 is activated, the antenna 50 is clamped to ground through the fourth switch 30. Alternatively, an external switch can be used to ground the antenna 50 and a switch control signal can be used to control the external switch, (not shown).

Thereafter, the master device 8 may use the general purpose output signal to send 8 clocks that correspond to address data 60 of 8 bits, encoded as 3 bits, (Act 114). After the address data 60 is sent, the general purpose output signal 12 goes high for at least four clock cycles to provide a first validation period 64 and to signal the end of the address data to the slave device 16, (Act 116). After the first validation period 64 is completed, the slave device 16 releases 62A the RF clamp signal 62, which unclamps the antenna 50 from ground, (Act 118).

After the first validation period 64, the general purpose output signal 12 may go low for four clock cycles to generate a second preset signal 66, (Act 120). In response to receipt of the second preset signal 66, the slave device 16 is configured to receive control data sent from the master device 8, (Act 122). As part of the preparation to receive control data, the slave device 16 activates the RF clamp signal 62 to prevent spurs from leaking through to the antenna 50 during programming, (Act 124). Thereafter, the master device 8 uses the general purpose output signal 12 to send control data 68 to the slave device 16. The control data 68 may be between one to sixteen clocks long, which corresponds to control data, (Act 126). The master device 8 sets the general purpose output high for four clock cycles to initiate a second validation period 70, (Act 128).

During this time, the states of operation of the slave device 16 are programmed based upon a mapping table between the received address 60, the control data 68 and a mapping table (not shown), (Act 130). Following the second validation period 70, the slave device 16 releases 62B the RF clamp signal 62, (Act 132), and the master device sets the general purpose output signal 12 to stay high 72, which provides a steady supply voltage to the slave device 16, (act 134).

Those skilled in the art will recognize improvements and modifications to the embodiments of the present disclosure. All such improvements and modifications are considered within the scope of the concepts disclosed herein and the claims that follow.

What is claimed is:

1. A communication system comprising:
- a master device including a general purpose output and a radio frequency port;
- a first duplexer including a first port, a second port, and a third port, wherein the second port is coupled to the radio frequency port and the third port is coupled to the general purpose output of the master device;
- a second duplexer including a first port, a second port, and a third port, wherein the first port of the second duplexer is in communication with the first port of the first duplexer, wherein the second port is coupled to an antenna, and wherein the third port is in communication with a slave device;
- wherein the slave device is coupled to the antenna, and where in response to commencement of a command, the slave device is further configured to clamp the antenna to ground.

2. The communication system of claim 1 further comprising:
- wherein the general purpose output is configured to provide both a supply voltage and control signal to the slave device.

3. The communication system of claim 1 wherein the first duplexer includes a choke coupled to a capacitor at a junction, wherein the first port of the first duplexer is coupled to the junction of the choke and the capacitor, the choke is further coupled to the second port of the first duplexer, and the capacitor is further coupled to the third port of the first duplexer.

4. The communication system of claim 1 further comprising a low pass filter coupled to the first port of the second duplexer, wherein an output of the low pass filter is coupled to a power-on reset input of the slave device.

5. The communication system of claim 4 wherein the slave device further includes a power input coupled to the output of the low pass filter.

6. The communication system of claim 1 further comprising a coaxial cable having a first end and a second end, wherein the first port of the first duplexer is coupled to the first end of the coaxial cable, and the first port of the second duplexer is coupled to the second end of the coaxial cable.

7. The communication system of claim 1 wherein the slave device further includes at least one terminating load.

8. The communication system of claim 7 wherein the slave device is further configured to decouple the antenna from ground in response to completion of the command.

9. A method of sending radio frequency data and commands over a coaxial cable comprising:
- receiving a supply voltage at a slave device via the coaxial cable;
- receiving a first preset signal at the slave device via the coaxial cable;
- in response to the first preset signal, the slave device entering a receive mode and clamping an antenna to ground;
- receiving an address at the slave device via the coaxial cable;
- receiving a first validation signal at the slave device via the coaxial cable;
- in response to receipt of the first validation signal, the slave device validating the address and releasing the antenna from ground;
- receiving a second preset signal at the slave device via the coaxial cable;
- in response to receipt of the second preset signal, the slave device preparing to receive a control data;
- receiving the control data at the slave device via the coaxial cable;
- in response to receipt of the control data, the slave device clamping the antenna to ground;
- receiving a second validation signal at the slave device via the coaxial cable; and
- in response to receipt of the second validation signal, the slave device unclamping the antenna from the ground.

10. A communication system comprising: a first duplexer including a first terminal, a second terminal and a third terminal; a coaxial cable having a first end and a second end, the first end of the coaxial cable coupled to the third terminal of the first duplexer;
- a second duplexer including a first terminal, a second terminal, and a third terminal, wherein the third terminal is coupled to the second end of the coaxial cable;
- a master device including an radio frequency port coupled to the first terminal of the first duplexer, and a control terminal coupled to the second terminal of the first duplexer;
- a low pass filter including an input and an output, wherein the input of the low pass filter is coupled to the second terminal of the second duplexer;
- an antenna coupled to the first terminal of the second duplexer; and
- a slave device including a power supply input coupled to the output of the low pass filter, a control input terminal coupled to the second terminal of the second duplexer, and a plurality of switches coupled to the antenna, wherein at least one of the plurality of switches is coupled to ground;
- wherein in response to commencement of a command message from the master device, the slave device is configured to clamp the antenna to the ground.

11. The communication system of claim 10 wherein each of the plurality of switches of the slave device is coupled to one of a plurality of load impedances; and wherein, the master device is configured to program the slave device to terminate the antenna with the one of the plurality of load impedances.

12. The communication system of claim 10 wherein the master device is configured to provide a power supply voltage at the slave device via the coaxial cable.

13. The communication system of claim 10 wherein the master device is configured to provide a first preset pulse to the slave device; and in response to the first preset pulse, the slave device is configured to clamp the antenna to ground.

14. The communication system of claim 13 wherein the master device is configured to provide an address and first validation signal to the slave device; and in response to receipt of the first validation signal, the slave device is configured to validate the address.

15. The communication system of claim 14 wherein the master device is further configured to provide a second preset signal to the slave device;

in response to the second preset signal, the slave device is configured to receive a command from the master device.

16. The communication system of claim 15 wherein the master device is configured to provide a second validation signal to the slave device to terminate the command; and in response to receipt of the second validation signal from the master device, the slave device is configured to unclamp the antenna from ground.

17. The communication system of claim 16 wherein further responds to receipt of the second validation signal from the master, the slave device is configured to couple a selected load impedance to the antenna.

* * * * *